(12) United States Patent
Hjorth et al.

(10) Patent No.: US 10,615,387 B2
(45) Date of Patent: Apr. 7, 2020

(54) BATTERY PROTECTIVE DEVICE FOR A VEHICLE

(71) Applicant: Volvo Car Corporation, Göteborg (SE)

(72) Inventors: Robin Hjorth, Göteborg (SE); Jens Raine, Varberg (SE); Martin Swahn, Halso (SE); Eric Lindmark, Mölndal (SE); Orhan Mesinovic, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 121 days.

(21) Appl. No.: 16/002,033

(22) Filed: Jun. 7, 2018

(65) Prior Publication Data

US 2019/0013503 A1 Jan. 10, 2019

(30) Foreign Application Priority Data

Jul. 5, 2017 (EP) .................................... 17179762

(51) Int. Cl.
*H01M 2/10* (2006.01)
*B60R 16/04* (2006.01)

(52) U.S. Cl.
CPC ........... *H01M 2/1094* (2013.01); *B60R 16/04* (2013.01); *H01M 2/1083* (2013.01); *H01M 2220/20* (2013.01)

(58) Field of Classification Search
CPC ............. H01M 2/1094; H01M 2/1083; H01M 2220/20; B60R 16/04
See application file for complete search history.

(56) References Cited

U.S. PATENT DOCUMENTS

| 6,871,829 B2 * | 3/2005 | Shannon, Jr. ........ A47G 11/002 180/68.5 |
| 2011/0045331 A1 * | 2/2011 | Wendorf ............. H01M 2/1083 429/100 |

FOREIGN PATENT DOCUMENTS

| DE | 102006057834 A1 | 6/2008 |
| DE | 102010050609 A1 | 6/2011 |
| DE | 102015013303 A1 | 5/2016 |
| EP | 1182093 A1 | 2/2002 |
| EP | 2578475 A1 | 4/2013 |

OTHER PUBLICATIONS

Jan. 12, 2018 European Search Report issue on International Application No. EP17179762.4.

* cited by examiner

*Primary Examiner* — Stewart A Fraser
(74) *Attorney, Agent, or Firm* — Clements Bernard Walker; Christopher L. Bernard

(57) ABSTRACT

A battery protective device for a vehicle, wherein the battery protective device includes a body, a first slide surface, a first bearing surface, a second bearing surface and an attachment bracket adapted for attaching the battery protective device to a battery. The battery protective device is adapted to protect the battery from damage during a crash, and to prevent the battery from escaping the engine compartment during a crash.

13 Claims, 2 Drawing Sheets

BATTERY PROTECTIVE DEVICE FOR A VEHICLE

CROSS-REFERENCE TO RELATED APPLICATION

The present patent application/patent claims the benefit of priority of co-pending European Patent Application No. 17179762.4, filed on Jul. 5, 2017, and entitled "BATTERY PROTECTIVE DEVICE FOR A VEHICLE," the contents of which are incorporated in full by reference herein.

TECHNICAL FIELD

The present invention relates to a battery protective device for a vehicle, adapted to be attached to a vehicle battery. The battery protective device comprises a body having a slide surface adapted to interact with a beam of a vehicle and a plurality of bearing surfaces adapted to bear on the battery when attached to the battery. At a crash, the battery protective device is adapted to protect the battery and to prevent the battery from escaping the engine compartment.

BACKGROUND ART

An engine compartment of a modern vehicle is rather crowded. This is due to several reasons. Firstly, vehicles are often smaller in size, which inevitably leads to a smaller engine compartment. Secondly, due to fuel savings, the front of the vehicle is more streamlined which also reduces the available size. Thirdly, more and more auxiliary equipment is placed in the engine compartment. This equipment includes both comfort functions and equipment used to reduce energy usage and exhaust emissions. In some vehicles, the battery is placed at the rear of the vehicle, in order to make place for other equipment in the engine compartment.

In vehicles where the battery is positioned at the front of the vehicle, in the engine compartment, the available space for the battery is reduced. Further, the possible mounting positions are also reduced. The mounting position of the battery will thus be enclosed by other parts, which means that there is no free space around the battery. If an accident occurs, it is thus a risk that the battery will be pressed into other components, or that other components will be pressed into the battery. This may damage the battery such that electrical functions of the vehicle will not function after the accident. Such functions may include an automatic emergency system, which sends an alarm signal to an emergency central. One such system is the Volvo on-call system. Another function may be an automatic door opening system, which opens the doors after the accident, such that passengers easily can escape the vehicle.

Another problem that may occur is that the battery leaves the engine compartment completely during an accident, due to the confined mounting space of the battery, where the attachment of the battery may not suffice.

Different solutions to this problem are known. One solution is to place the battery in the rear of the vehicle, where it is well protected. One disadvantage is the required long, heavy and costly cables that connect the battery with power components at the engine, such as the alternator and the starter motor. Another solution is to use a second, smaller battery that can power specific components after an accident. This is a complicated and costly solution, which may malfunction if there is a short circuit in the main battery. A further solution is to place the battery in a specific protection box, which is both costly and which occupies a large volume in the engine compartment.

There is thus room for an improved battery protective device for a vehicle.

DISCLOSURE OF THE INVENTION

An object of the invention is therefore to provide an improved battery protective device which is adapted to protect the battery during a crash. A further object is to provide an improved battery protective device that is adapted to prevent the battery from escaping the vehicle during a crash.

The solution to the problem according to the invention is described in the characterizing part regarding the battery protective device, regarding the battery and regarding the vehicle. The other aspects contain advantageous further developments of the inventive battery protective device and the battery.

In a battery protective device for a vehicle, the object of the invention is achieved in that the battery protective device comprises a body, a first slide surface, a first bearing surface, a second bearing surface and an attachment bracket adapted for attaching the battery protective device to a battery.

By this first embodiment of a battery protective device according to the invention, a battery protective device adapted to be attached to a vehicle battery is provided, where the battery protective device comprises a body having a slide surface adapted to interact with a beam or other structural element of the vehicle. The slide surface of the battery protective device will slide against the beam and will thus help to direct the battery in a safe direction, in which the battery will not be damaged. The battery protective device further comprises a first bearing surface and a second bearing surface adapted to bear against the battery. The bearing surfaces will distribute the force acting on the battery protective device to the battery, such that there will not be a point load on the battery. This will help to protect the battery during the crash, such that the battery will be able to power electrical functions after the crash.

The battery protective device is adapted to be attached to the battery on the upper part of the battery, such that a first bearing surface of the battery protective device will bear on the upper surface of the battery and that a second bearing surface of the battery protective device will bear on a side surface of the battery. The side surface of the battery is preferably the side of the battery pointing rearwards of a vehicle, i.e. the rear side of the battery when mounted in a vehicle. The battery protective device may also comprise a second slide surface arranged on the upper side of the body, which is parallel to the first bearing surface. The second slide surface is positioned higher than the battery pole of the battery when mounted on a battery. This will help to prevent the battery pole from coming in contact with the beam of the vehicle. This will further protect the battery pole from being damaged, and may prevent a short circuit.

The attachment bracket may be integral with the battery protective device, or may be attached to the battery protective device with screws. The battery protective device may be made from aluminium or composite plastic, preferably comprising fibres. The battery protective device is preferably rigid, such that it is not deformed during an accident. It may be made from extruded aluminium. The battery protective device is preferably attached to a battery by a strap. The strap will hold the battery protective device in position on the battery, and the bearing surfaces will take the load acting on the battery protective device during an accident. The strap must thus not be able to withstand the load on the battery during an accident.

BRIEF DESCRIPTION OF THE DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
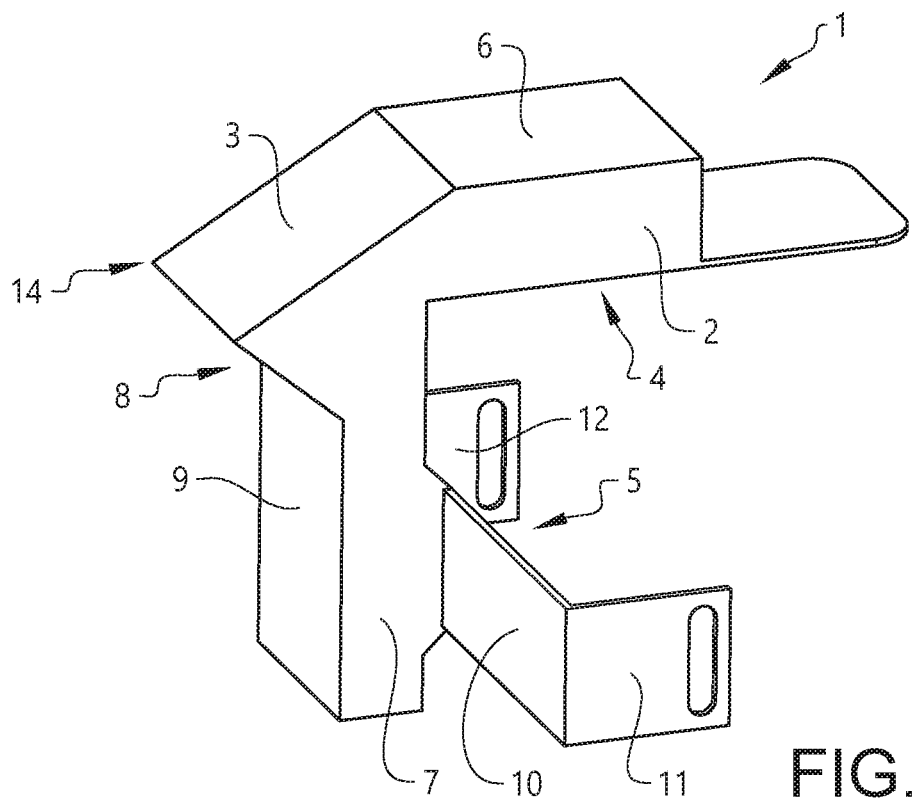
FIG. 1 shows a schematic battery protective device according to the invention.
Figure 2:
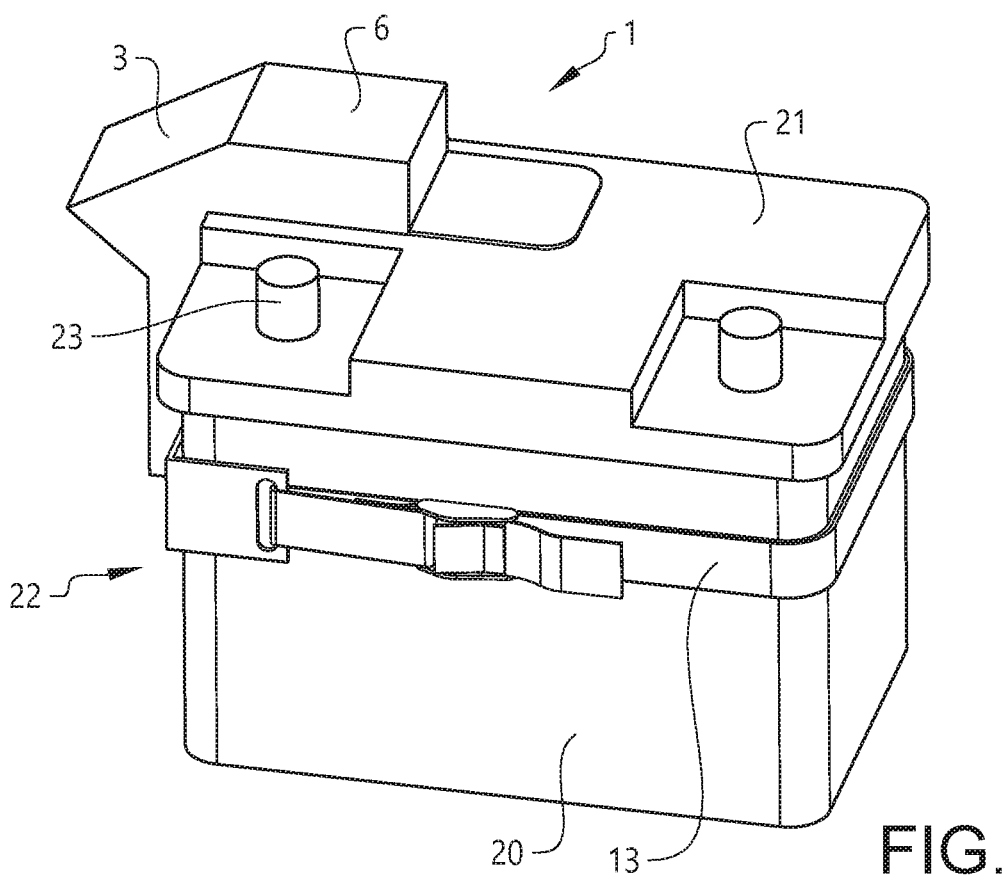
FIG. 2 shows a schematic battery with an attached battery protective device according to the invention.
Figure 3:
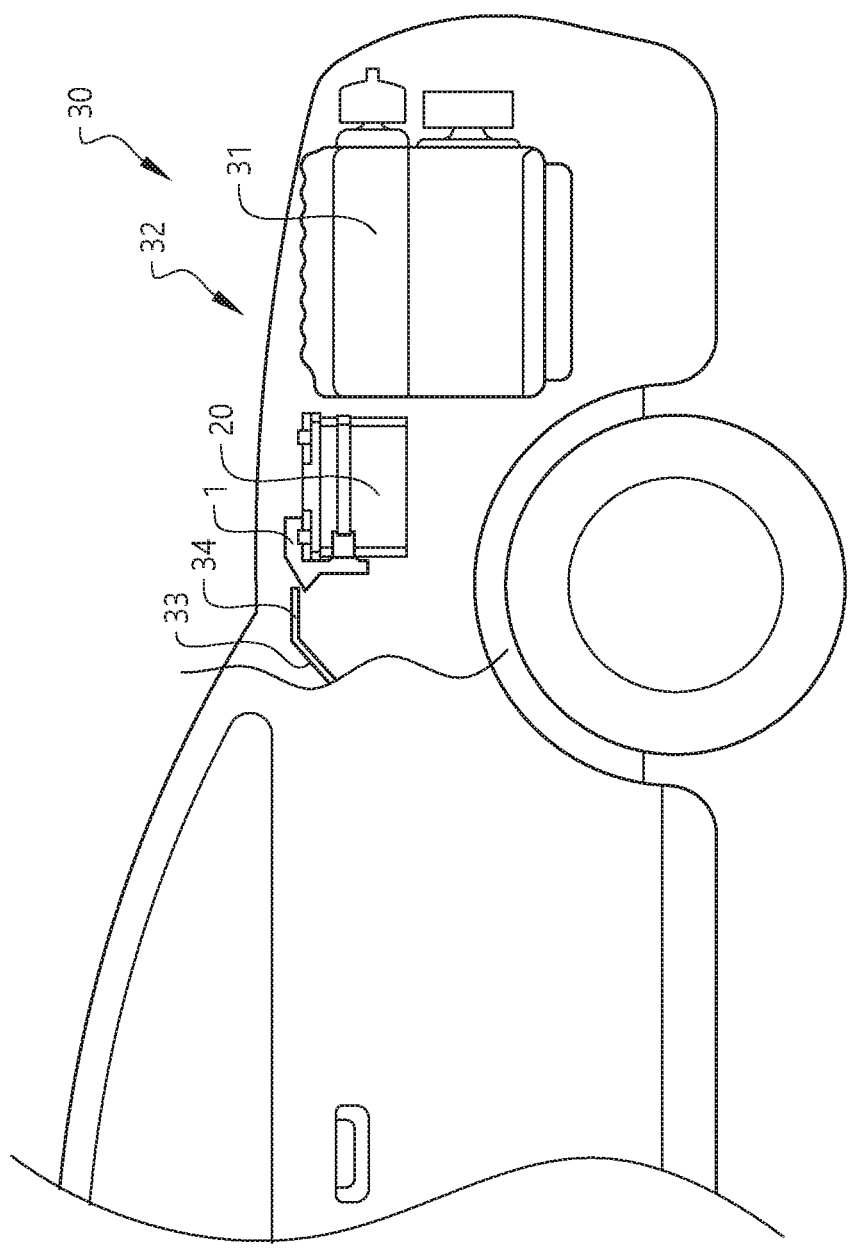
FIG. 3 shows a schematic cut view of a vehicle comprising a battery with an attached battery protective device according to the invention.

FIG. 1 shows a battery protective device 1 with an attachment bracket 10, FIG. 2 shows a battery with an attached battery protective device, and FIG. 3 shows a cut view of a vehicle comprising a battery with an attached battery protective device. The battery protective device 1 comprises a body 2. The body is preferably rigid and may be made from a metal or a plastic material, and may be moulded or extruded. If a plastic material is used, it is preferred to use a fibre reinforced plastic material. The purpose of the battery protective device is to protect the battery during a crash in an accident. The battery protective device must in this case be able to distribute the forces acting on the battery protective device to a sufficient large part of the battery, such that the battery is not damaged during the accident. A further purpose of the battery protective device is to control the position of the battery in the engine compartment during the crash. The battery protective device will thus be able to steer the battery in a predefined direction during the crash, and at the same time protect the battery from damage. Without a battery protective device, the battery may be damaged and/or may even be thrown out of the engine compartment during a crash.

The body 2 of the battery protective device 1 comprises a first slide surface 3 adapted to slide against a transverse beam 34 of the vehicle 30. The transverse beam is in the shown example part of the cowl 33 of the vehicle, and is positioned at the rear of the engine compartment 32. The first slide surface 3 is inclined such that it will be able to direct the battery somewhat downwards during a crash. During a crash, the battery will move rearwards in the engine compartment due to deformation of the structures holding the battery. The complete engine compartment will be compressed and most parts will move rearwards and/or will be deformed. The inclined surface will thus bear on the transverse beam and will direct the battery downwards at the same time that the battery moves rearwards. A downward movement of the battery during a crash will further move the battery pole away from the transverse beam. The inclination angle of the first slide surface depends on the actual mounting position and the position of the transverse beam, but is preferably in a range of 30 to 60 degrees, when compared to a horizontal plane.

The body comprises a second slide surface 6 arranged at the top of the battery protective device. The second slide surface is adjacent the first slide surface 3 and is adapted to slide against the transverse beam when the first slide surface has passed the front end of the transverse beam, i.e. when the battery continues to move rearwards. The first slide surface pushes the battery down somewhat during a crash, and the second slide surface holds the battery in that height position during the last part of the crash. The second slide surface will further prevent the battery pole to come in contact with the transverse beam. The second slide surface is thus arranged above the upper side of the battery pole, here the negative battery pole. Preferably, the height distance between the second slide surface and the upper side of the battery pole is at least 10 mm, and preferably twice the height of the battery pole.

A further advantage of directing the battery downwards and thereby allowing the battery to move rearwards is that the positive pole of the battery will also move rearwards. The positive pole is in this example positioned at the front of the battery, in the direction towards the front of the vehicle. When the positive pole moves rearwards, the risk that other components come in contact with or damages the positive pole decreases.

The body further comprises a front surface 9 arranged below the first slide surface 3. The front surface may also protect the battery from hitting the rear wall of the cowl. Here, part of the front surface is inclined, and part of the front surface is vertical. A tip 14 is created between the first slide surface 3 and the front surface 9. The body comprises a first side surface 7 and a second side surface 8. In the shown example, the first side surface and the second side surface are vertical, but they may be inclined or have another shape. The body further comprises a first bearing surface 3 and a second bearing surface 4. The first bearing surface will be arranged in a horizontal direction when mounted on a battery, and is parallel to the second slide surface. The first bearing surface is adapted to bear on the upper side of the battery and is for this reason flat. The second bearing surface is adapted to bear on a side surface of the battery, and may for this reason be shaped to correspond to the shape of the side of the battery. In the shown example, the battery protective device is adapted to be attached to a short side of the battery. The battery is adapted to be mounted with its longer side parallel to a longitudinal plane of the vehicle, with the battery protective device arranged at the rear part of the battery, on the side of the battery pointing to the rear of the vehicle.

The width w of the battery protective device 1 is preferably less than the width W of the battery. By positioning the battery protective device at that part of the battery where an impact from a structure part of the vehicle will hit the battery, weight and cost can be saved. Since the battery protective device is rigid, the forces of the impact will be distributed over the complete bearing surfaces of the battery protective device. It is thus important that the bearing surfaces are large enough for distributing the impact force. In the shown example, the battery protective device is positioned adjacent the negative battery pole, and covers less than half the width W of the battery.

The attachment bracket may be integral with the battery protective device, or may be made from a bent metal sheet attached to the battery protective device with screws. If the attachment bracket is made from a bent metal sheet, it may cover the first bearing surface and the second bearing surface, and may be attached to the second bearing surface. It may also be attached to the front surface 9 of the body. The attachment bracket is provided with a first flange 11 and a second flange 12. The distance between the first flange and the second flange corresponds to the width of a battery. The attachment bracket will thus hold the battery protective device 1 in a predefined position when it is attached to a battery. The attachment bracket is in the shown example attached to the battery with a strap. The strap and the attachment bracket will hold the battery protective device in the predefined position on the battery, and the bearing surfaces of the battery protective device will take the load acting on the battery protective device during an accident. The strap must thus not be able to withstand the load on the battery during an accident.

FIG. 2 shows a battery 20 with an attached battery protective device 1. The battery protective device bears on the upper surface 21 of the battery with the first bearing surface 3 and on a side surface 22 with the second bearing surface 5. Here, the side surface 22 of the battery will be the rear side of the battery when the battery is mounted in a vehicle. As can be seen in the figure, the second slide surface is positioned higher than the battery pole 23 of the battery. Here, the battery pole 23 is the negative battery pole. Even if the negative battery pole is connected to the ground of the vehicle, which is connected to the chassis of the vehicle, it is of advantage to protect the battery pole from touching the transverse beam of the vehicle during a crash. One reason may be that the battery pole or the cable connected to the battery pole may be damaged and may break. Another reason may be that the connection may comprise a security means that may break the connection between the battery pole and the ground of the vehicle. The electric equipment of the vehicle will not function in such a case.

FIG. 3 shows a vehicle 30 with a mounted battery 20 comprising a battery protective device 1. The battery is mounted in the engine compartment 32, behind and above the combustion engine 31. The battery is mounted at the rear of the engine compartment, close to the cowl 33, and close to a transverse beam 34. The battery is mounted in a horizontal direction, with the upper surface 21 in a horizontal plane. The battery protective device is arranged at the rear side of the battery. The tip 14 of the body 2 is arranged lower than the transverse beam. The tip is also arranged underneath the transverse beam, and extends somewhat behind the front end of the transverse beam in a rearward direction. This will ensure that the battery and the battery protective device are forced rearwards and downwards during a crash, and that the battery does not escape the mounting position during a crash.

The invention is not to be regarded as being limited to the embodiments described above, a number of additional variants and modifications being possible within the scope of the subsequent patent claims.

The invention claimed is:

1. A battery protective device for a vehicle, wherein the battery protective device comprises:
 a body,
 a first slide surface, wherein the first slide surface is inclined and adapted to interact with a structure of the vehicle to direct a battery downwards in the event of a crash,
 a first bearing surface,
 a second bearing surface, and
 an attachment bracket adapted for attaching the battery protective device to the battery.

2. The battery protective device according to claim 1, wherein the first bearing surface is adapted to bear on the upper surface of the battery when attached to the battery, and wherein the second bearing surface is adapted to bear on a side surface of the battery when attached to the battery.

3. The battery protective device according to claim 1, wherein the attachment bracket is integral with the body.

4. The battery protective device according to claim 1, wherein the attachment bracket is attached to the body with screws.

5. The battery protective device according to claim 1, wherein the first bearing surface and the second bearing surface are perpendicular to each other.

6. The battery protective device according to claim 1, wherein the battery protective device is adapted to be attached to the battery with a strap.

7. The battery protective device according to claim 1, wherein the battery protective device comprises a second slide surface which is substantially parallel to the first bearing surface.

8. The battery protective device according to claim 1, wherein the width of the battery protective device is less than half of the width of the battery on which it is to be attached.

9. A battery, wherein the battery comprises a battery protective device according to claim 1.

10. The battery according to claim 9, wherein the battery protective device is arranged adjacent a negative battery pole of the battery.

11. The battery according to claim 10, wherein the battery protective device is positioned on a short side of the battery adjacent the negative battery pole.

12. A vehicle, wherein the vehicle comprises a battery according to claim 9, where the battery is mounted at an engine compartment at the front of the vehicle.

13. The vehicle according to claim 12, wherein the battery is positioned with the battery protective device directed rearwards of the vehicle.

\* \* \* \* \*